United States Patent
Knox et al.

(10) Patent No.: US 8,897,951 B1
(45) Date of Patent: *Nov. 25, 2014

(54) AIRCRAFT INTERIOR COMPONENT MAINTENANCE

(71) Applicant: The Boeing Company, Chicago, IL (US)

(72) Inventors: James Don Knox, Issaquah, WA (US); David W. Allen, Issaquah, WA (US); Jose R. Elias, Seattle, WA (US); Rebecca J. Shore, Seattle, WA (US); Tommy T. Nguyen, Seattle, WA (US); Lois T. Hill, Federal Way, WA (US); Paul F. Seeger, Buckley, WA (US); Edwin Keith Riner, Lynnwood, WA (US); David Scott Kinney, Everett, WA (US); Michael J. Buckley, Seattle, WA (US); William P. Coop, Buckley, WA (US)

(73) Assignee: The Boeing Company, Chicago, IL (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/782,475

(22) Filed: Mar. 1, 2013

(51) Int. Cl.
*G01M 17/00* (2006.01)
*B64F 5/00* (2006.01)

(52) U.S. Cl.
CPC .................................. *B64F 5/00* (2013.01)
USPC .................. 701/29.1; 701/29.4; 701/31.4

(58) Field of Classification Search
CPC ....... G07C 5/008; G07C 5/006; G01M 15/05; G01S 5/02
USPC ........................... 701/29.1, 29.4, 31.4
See application file for complete search history.

(56) References Cited

U.S. PATENT DOCUMENTS

| | | | |
|---|---|---|---|
| 5,974,349 A * | 10/1999 | Levine | 701/29.6 |
| 6,618,654 B1 * | 9/2003 | Zaat | 701/31.9 |
| 7,545,270 B2 | 6/2009 | Pickering et al. | |
| 7,545,274 B2 | 6/2009 | Coop | |
| 7,548,802 B2 | 6/2009 | Avery et al. | |
| 7,551,086 B2 | 6/2009 | Coop et al. | |
| 2004/0039502 A1 * | 2/2004 | Wilson et al. | 701/29 |
| 2006/0055564 A1 * | 3/2006 | Olsen et al. | 340/994 |
| 2006/0248182 A1 * | 11/2006 | Glassco et al. | 709/223 |
| 2007/0112488 A1 * | 5/2007 | Avery et al. | 701/35 |
| 2007/0114280 A1 * | 5/2007 | Coop et al. | 235/385 |
| 2010/0023151 A1 * | 1/2010 | Shieh et al. | 700/105 |
| 2011/0298638 A1 * | 12/2011 | Groeneweg | 340/905 |
| 2012/0127924 A1 * | 5/2012 | Bandyopadhyay et al. | 370/328 |
| 2012/0150380 A1 * | 6/2012 | Whittaker | 701/29.4 |

OTHER PUBLICATIONS

Coop et al., "Maintaining the Airworthiness Configuration of Aircraft," U.S. Appl. No. 13/664,121, filed Oct. 30, 2012, 44 pages.

(Continued)

*Primary Examiner* — Hussein A. Elchanti
(74) *Attorney, Agent, or Firm* — Yee & Associates, P.C.

(57) ABSTRACT

A method and apparatus for maintaining a component on a vehicle. Component maintenance information is read from an automated identification technology tag on the vehicle, wherein the automated identification technology tag is associated with an interior component on the vehicle. A remaining portion of a maintenance period for the interior component is determined using the component maintenance information. An indication of the remaining portion of the maintenance period is displayed on a user interface.

20 Claims, 8 Drawing Sheets

(56) References Cited

OTHER PUBLICATIONS

Coop et al., "Aircraft Rework Management," U.S. Appl. No. 13/644,827, filed Oct. 4, 2012, 42 pages.
Office Action, dated May 30, 2014, regarding U.S. Appl. No. 13/664,121, 18 pages.
Office Action, dated May 30, 2014, regarding U.S. Appl. No. 13/644,827, 19 pages.
Final Office Action, dated Aug. 8, 2014, regarding U.S. Appl. No. 13/664,121, 13 pages.
Notice of Allowance, dated Aug. 12, 2014, regarding U.S. Appl. No. 13/644,827, 9 pages.

* cited by examiner

FIG. 7

| Nomenclature Select | Compartment | Part Number Select | Aircraft Effectivity Select | CMM Reference | Galley | Status/Threshold 20% ~704 |
|---|---|---|---|---|---|---|
| Coffee maker | 123 | 4511-2121-02 | 747-400 EEI | 12345 | F1 | 95% |
| Coffee maker | 209 | 4511-2121-02 | 747-400 EEI | 67897 | M1 | 80% |
| Coffee maker | 231 | 4511-2121-02 | 747-400 EEI | 56432 | M2 | 70% |
| Coffee maker | 410 | 4511-2121-02 | 747-400 EEI | 87654 | M5 | 60% |
| Coffee maker | 411 | 4511-2121-02 | 747-400 EEI | 98712 | M5 | 30% |
| Coffee maker | 536 | 4511-2121-02 | 747-400 EEI | | | 10% - 706 |
| Coffee maker | 537 | 4511-2121-02 | 747-400 EEI | | | 95% |

Select One — 708
- Check Inventory
- Schedule Maintenance
- Review Trends
- Review History
- Supply Chain Alert
- Ignore 700
702

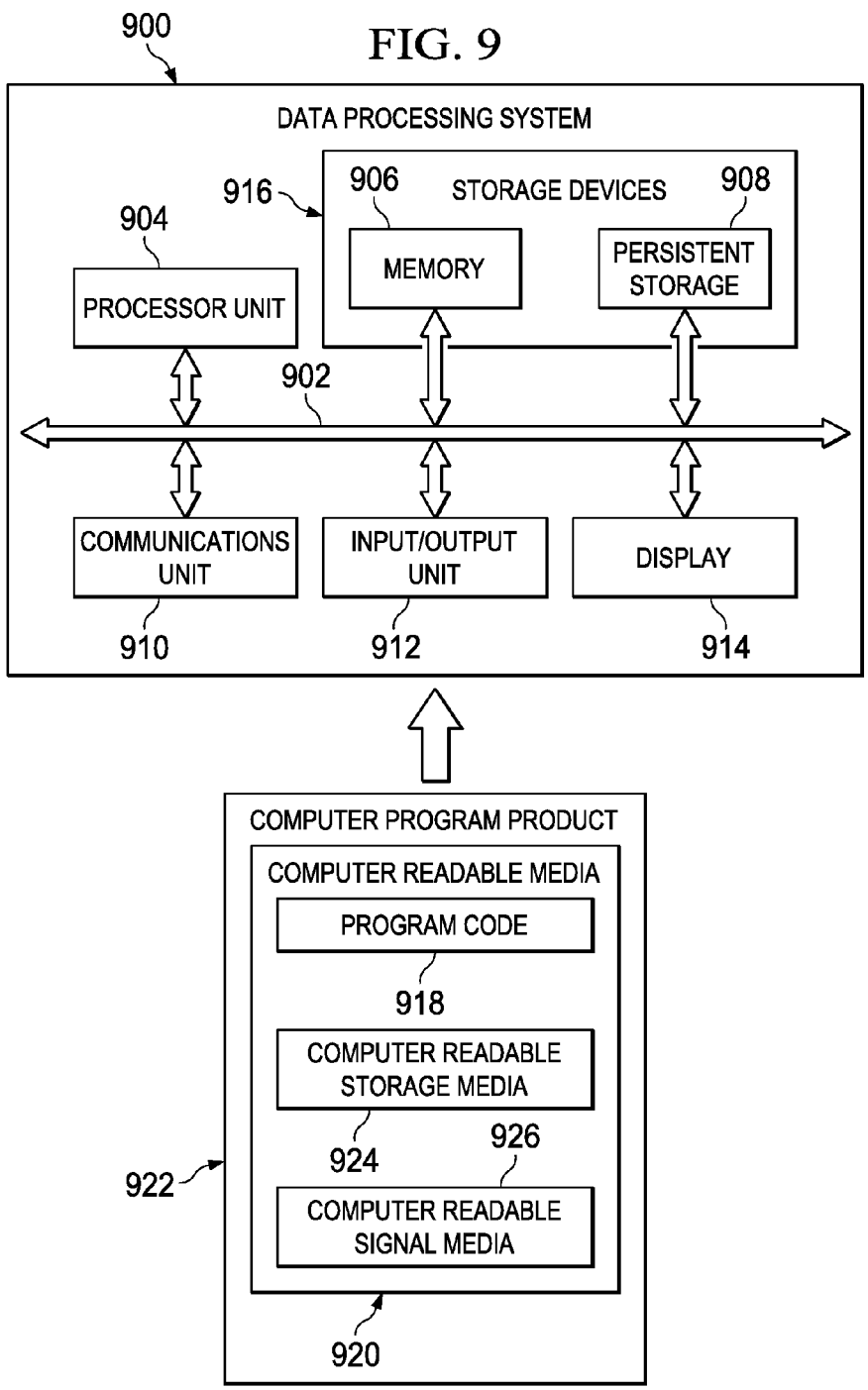

AIRCRAFT INTERIOR COMPONENT MAINTENANCE

BACKGROUND INFORMATION

1. Field

The present disclosure relates generally to the maintenance of components on aircraft and other vehicles. More particularly, the present disclosure relates to a system and method for using automated identification technology tags to manage the maintenance of interior components on an aircraft, such as appliances in the galley of the aircraft.

2. Background

Various components may be provided on the interior of an aircraft for the convenience of the flight crew during operation of the aircraft, the comfort of passengers on the aircraft, or both. For example, various appliances may be provided in the galley or at other locations on the interior of a commercial or other aircraft. The flight crew or other personnel may use these appliances to provide food and drink service to the passengers in an effective and efficient manner. Such appliances may include, for example, without limitation, steam ovens, microwave ovens, coffee makers, chillers, trash compactors, or other appliances and various combinations of appliances. These appliances may be provided as galley inserts that may be removed from the aircraft for maintenance or replacement as may be needed or desired.

It may be desirable to maintain galley appliances and other interior components of an aircraft in working order. Galley appliances and other interior components of an aircraft that are not in working order may affect the operation of the aircraft by the flight crew and the comfort of the aircraft passengers in undesired ways. For example, a galley appliance that is not in working order may affect the ability of the flight crew to provide the desired level of service to passengers during a flight.

Galley appliances and other interior components of an aircraft that are not in working order may be removed from the aircraft for maintenance and replaced with components that are in working order. However, it may not be possible to replace a galley appliance or other interior component of an aircraft in a timely manner if it is discovered either during a flight or soon before a flight is scheduled to depart that the component is not working properly. For example, a replacement component may not be available on the aircraft in flight or at the airport from which the flight will soon depart. Further, if a replacement component is available, there may not be enough time to replace the interior component of the aircraft that is found not to be working without delaying the flight. In these examples, the flight may have to proceed with a galley appliance or other component that is not in working order.

Automated identification technology may be used to automatically identify objects, collect data about the objects, and enter that data directly into a computer system with little or no human involvement. Automated identification technology tags may be attached to various objects. Examples of automated identification technology tags may include radio frequency identification (RFID) tags and contact memory buttons. Information identifying the object and various characteristics of the object may be stored in the tags. This information may be read from the tags and automatically entered into a computer system for processing using an appropriate reader device. Such automated identification technology has not been fully utilized for the maintenance of aircraft components.

Accordingly, it would be beneficial to have a method and apparatus that takes into account one or more of the issues discussed above as well as possibly other issues.

SUMMARY

An illustrative embodiment of the present disclosure provides a method for maintaining a component on a vehicle. Component maintenance information is read from an automated identification technology tag on the vehicle, wherein the automated identification technology tag is associated with an interior component on the vehicle. A remaining portion of a maintenance period for the interior component is determined using the component maintenance information. An indication of the remaining portion of the maintenance period is displayed on a user interface.

Another illustrative embodiment of the present disclosure provides an apparatus comprising a reader, a remaining maintenance period calculator, and a user interface generator. The reader is configured to read component maintenance information from an automated identification technology tag on the vehicle, wherein the automated identification technology tag is associated with an interior component on the vehicle. The remaining maintenance period calculator is configured to determine a remaining portion of a maintenance period for the interior component using the component maintenance information. The user interface generator is configured to display an indication of the remaining portion of the maintenance period on a user interface.

Another illustrative embodiment of the present disclosure provides a method for maintaining an interior component on an aircraft. Component maintenance information is read from an automated identification technology tag on the aircraft, wherein the automated identification technology tag is associated with the interior component on the aircraft. The component maintenance information comprises installation time information identifying a time that the interior component is installed on the aircraft. A remaining portion of a maintenance period for the interior component is determined using the installation time information. An indication of the remaining portion of the maintenance period is displayed on a user interface.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

FIG. 7 is an illustration of a maintenance report in accordance with an illustrative embodiment;

FIG. 9 is an illustration of a block diagram of a data processing system in accordance with an illustrative embodiment.

DETAILED DESCRIPTION

The different illustrative embodiments recognize and take into account a number of different considerations. "A number", as used herein with reference to items, means one or more items. For example, "a number of different considerations" means one or more different considerations.

The different illustrative embodiments recognize and take into account that it may be desirable to maintain galley appliances and other interior components of an aircraft in working order. Galley appliances and other interior components of an aircraft that are not in working order may affect the operation of the aircraft by the flight crew and the comfort of passengers on the aircraft in undesired ways. Galley appliances and other interior components of an aircraft that are discovered not to be working either during a flight or soon before a flight is scheduled to depart may not be able to be replaced with working components in a timely manner.

In accordance with an illustrative embodiment, component maintenance information may be stored in an automated identification technology tag that is attached to an aircraft or other vehicle on or near a galley appliance or other interior component on the vehicle. The component maintenance information may include information identifying when the component was installed on the vehicle or when maintenance was last performed on the component. A technician may employ a portable maintenance device to read the component maintenance information from the automated identification technology tag and to display the component maintenance information on a user interface.

The portable maintenance device may be configured to use the component maintenance information read from the automated identification technology tag to determine a remaining portion of a maintenance period for the component and to display an indication of the remaining portion of the maintenance period. The maintenance period for the component may be an amount of time between when the component is installed or was last maintained and when the component should be removed for maintenance or replacement. The component may be replaced or scheduled for replacement when the remaining portion of the maintenance period is less than a selected maintenance period threshold. In this manner, a galley appliance or other interior component on an aircraft or other vehicle may be replaced in a timely manner before the component is likely to stop working.

Figure 1:
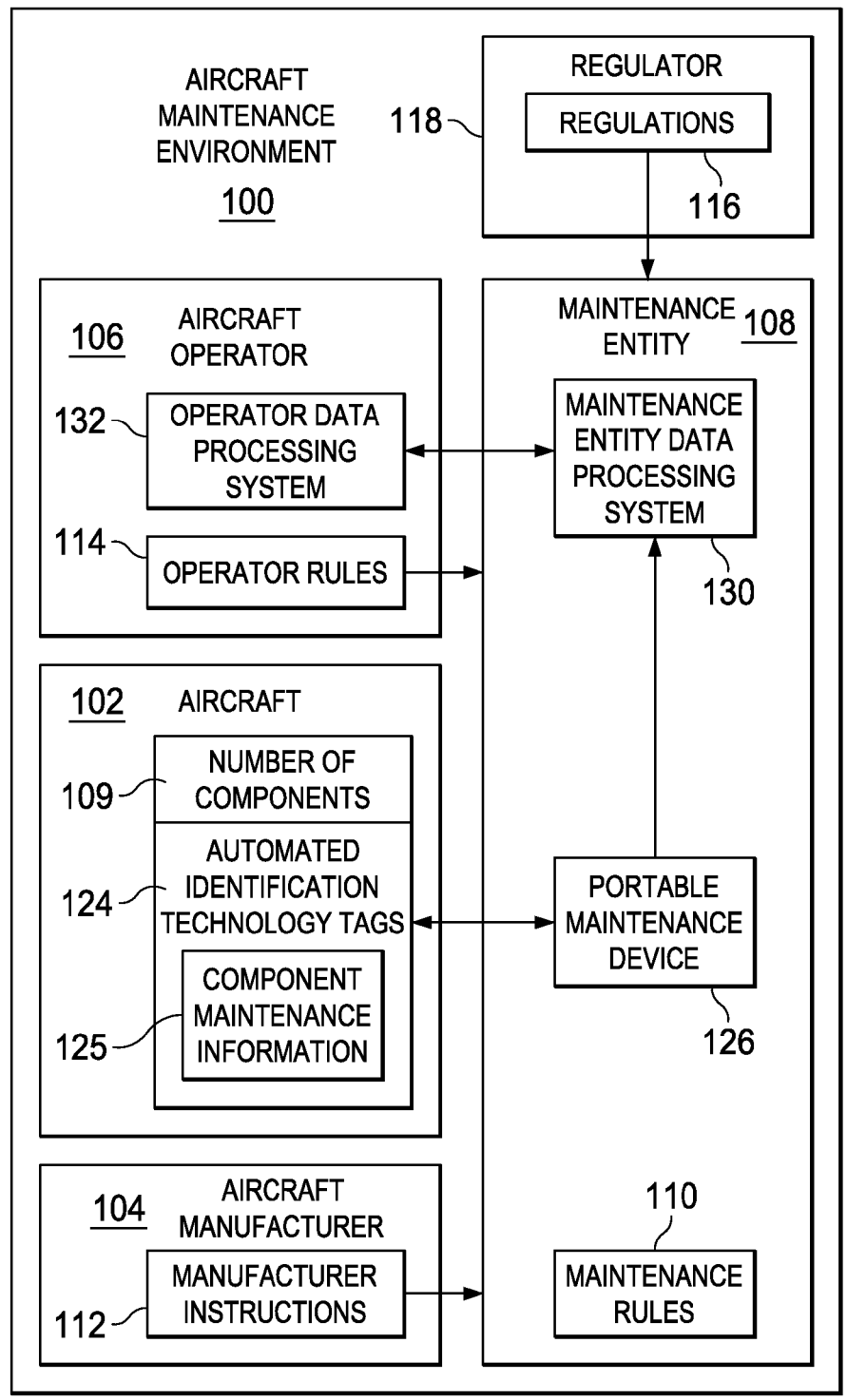
FIG. 1 is an illustration of a block diagram of an aircraft maintenance environment in accordance with an illustrative embodiment.

Turning now to FIG. 1, an illustration of a block diagram of an aircraft maintenance environment is depicted in accordance with an illustrative embodiment. In this illustrative example, aircraft maintenance environment 100 comprises aircraft 102. Aircraft 102 may include any type of commercial, military, or other aircraft. Aircraft 102 in aircraft maintenance environment 100 may be manufactured by aircraft manufacturer 104 and operated by aircraft operator 106. Aircraft operator 106 may be an airline, military unit or other government entity, or any other operator of aircraft 102.

Aircraft 102 may be maintained by maintenance entity 108. Maintenance entity 108 may be any entity for maintaining aircraft 102. For example, maintenance entity 108 may be aircraft operator 106 or a third party employed by aircraft operator 106 to maintain aircraft 102. For example, without limitation, maintenance entity 108 may include aircraft manufacturer 104.

Maintenance entity 108 may inspect and maintain number of components 109 on aircraft 102. For example, without limitation, number of components 109 may include various components on the interior of aircraft 102.

Maintenance entity 108 may maintain number of components 109 in accordance with maintenance rules 110. Maintenance rules 110 may define various procedures for inspecting and maintaining number of components 109 on aircraft 102. For example, without limitation, maintenance rules 110 may define when number of components 109 should be inspected or removed from aircraft 102 for maintenance or replacement.

Maintenance rules 110 may be developed and provided to maintenance entity 108 by various entities. For example, maintenance rules 110 may include manufacturer instructions 112. Manufacturer instructions 112 may be provided by aircraft manufacturer 104. For example, without limitation, manufacturer instructions 112 may specify procedures for inspection, maintenance, rework, and replacement of number of components 109 on aircraft 102. In this case, some or all of manufacturer instructions 112 may be provided by manufacturers of number of components 109. Maintenance rules 110 also may include operator rules 114. Operator rules 114 may include rules provided by aircraft operator 106 for the inspection and maintenance of number of components 109 on aircraft 102.

Maintenance rules 110 may be developed by aircraft manufacturer 104, aircraft operator 106, another entity, or a combination of entities to satisfy regulations 116. Regulations 116 may be issued by regulator 118. For example, regulator 118 may be a government agency or other entity with authority to issue regulations 116.

In accordance with an illustrative embodiment, automated identification technology tags 124 may be associated with number of components 109 on aircraft 102. For example, automated identification technology tags 124 may be attached to number of components 109. Component maintenance information 125 for number of components 109 may be stored on automated identification technology tags 124. In accordance with an illustrative embodiment, component maintenance information 125 may include information for identifying when number of components 109 should be removed from aircraft 102 for maintenance or replacement. For example, without limitation, component maintenance information 125 may include information identifying when number of components 109 were installed on aircraft 102.

In accordance with an illustrative embodiment, portable maintenance device 126 may be used by maintenance entity 108 to store component maintenance information 125 on automated identification technology tags 124 associated with number of components 109. For example, without limitation, portable maintenance device 126 may be used to store component maintenance information 125 on automated identification technology tags 124 at the time that corresponding number of components 109 are installed on aircraft 102.

Portable maintenance device 126 also may be used by maintenance entity 108 to read component maintenance information 125 for number of components 109 from automated identification technology tags 124. Component maintenance information 125 read from automated identification technology tags 124 may be displayed on portable maintenance device 126 and may be used to provide an indication to maintenance entity 108 when it is time to maintain or replace number of components 109.

Component maintenance information 125 read from automated identification technology tags 124 may be provided from portable maintenance device 126 to maintenance entity data processing system 130 via any appropriate wired or wireless connection. Maintenance entity data processing system 130 may be configured to process component maintenance information 125 provided by portable maintenance device 126 for use by maintenance entity 108 to manage the maintenance of number of components 109 on aircraft 102.

Component maintenance information 125 and other information related to the maintenance of number of components 109 on aircraft 102 may be provided from maintenance entity data processing system 130 to operator data processing system 132 via any appropriate network or other connection. Operator data processing system 132 may be used by aircraft operator 106 to manage the operation of aircraft 102.

Figure 2:
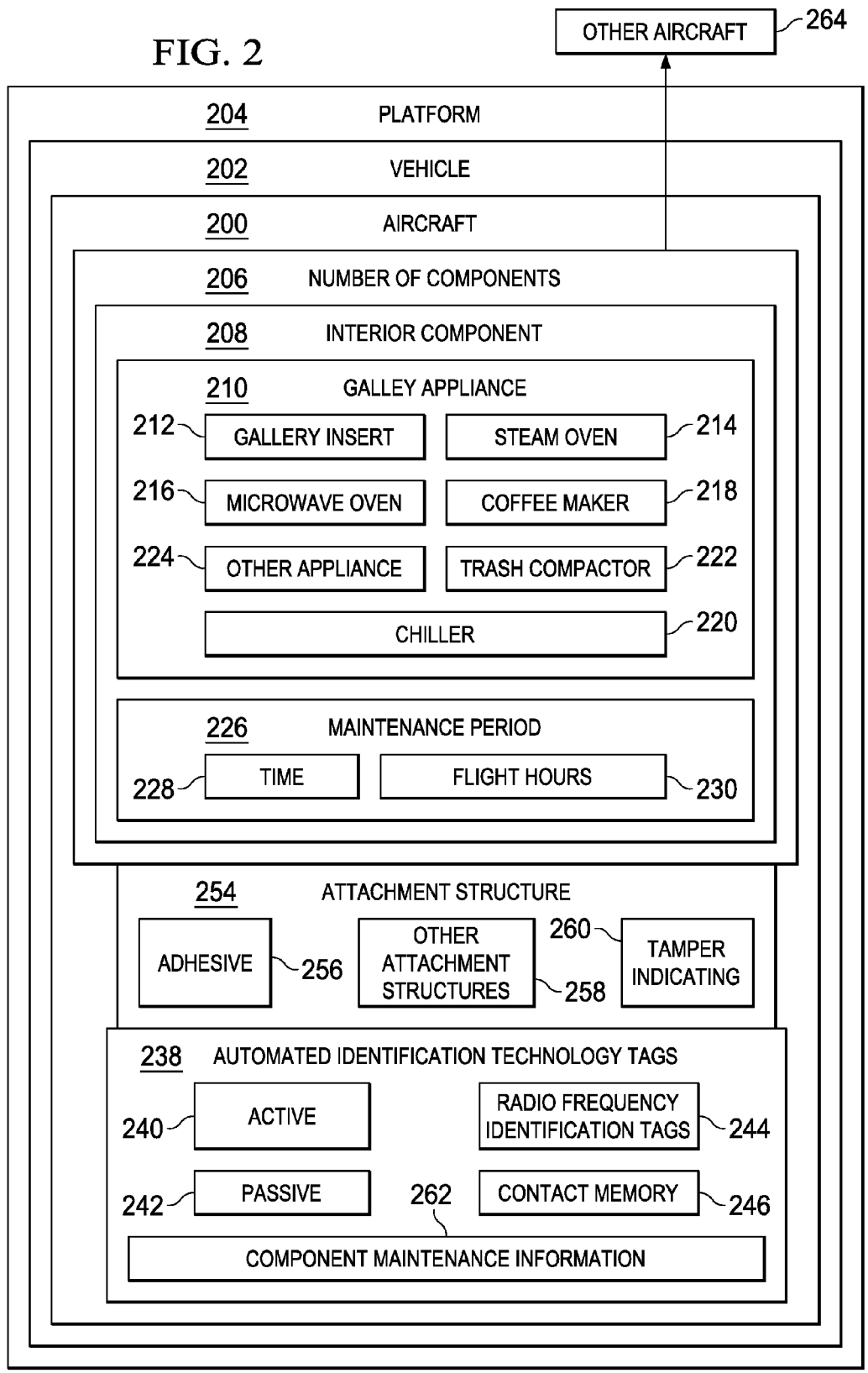
FIG. 2 is an illustration of a block diagram of an aircraft in accordance with an illustrative embodiment.

Turning now to FIG. 2, an illustration of a block diagram of an aircraft is depicted in accordance with an illustrative embodiment. In this example, aircraft 200 is an example of one implementation of aircraft 102 in FIG. 1.

Aircraft 200 is an example of vehicle 202. Illustrative embodiments may be used for the maintenance of components on vehicle 202 other than aircraft 200. Vehicle 202 may be any vehicle configured for operation in the air, in space, on land, on water, under water, or in any other medium or combinations of media.

Vehicle 202 is an example of platform 204. Illustrative embodiments may be used for the maintenance of components on platform 204 other than vehicle 202. For example, platform 204 may be any fixed or mobile structure.

Aircraft 200 may include number of components 206. Number of components 206 may include various parts of aircraft 200. For example, number of components 206 may include interior component 208. Interior component 208 may include any component located in the interior of aircraft 200. For example, interior component 208 may be located in any cabin or other interior location on aircraft 200.

Interior component 208 may be galley appliance 210. Galley appliance 210 may be provided as galley insert 212 that may be installed for use in a galley on aircraft 200 and removed from the galley on aircraft 200 for maintenance or replacement. For example, without limitation, galley appliance 210 may include steam oven 214, microwave oven 216, coffee maker 218, chiller 220, trash compactor 222, or other appliance 224.

Maintenance period 226 may be associated with interior component 208. Maintenance period 226 may be defined as an amount of time 228 that interior component 208 is expected to remain in working order after interior component 208 is installed on aircraft 200 or maintained. Maintenance period 226 may be determined based on historical data for the use and maintenance of components like interior component 208 or by using any other data that may indicate the amount of time 228 that interior component 208 is expected to remain in working order after being maintained or installed on aircraft 200. For example, without limitation, maintenance period 226 may be determined based on the type of interior component 208, a specific model of the type of interior component 208, the type of aircraft 200 on which interior component 208 is installed, the specific aircraft 200 on which interior component 208 is installed, the location on aircraft 200 at which interior component 208 is installed, the types of flights on which interior component 208 is typically used, or any other factors or various combinations of factors.

Time 228 of maintenance period 226 may be expressed in years, months, weeks, days, hours, or any other appropriate calendar time or clock time. Alternatively, or in addition, maintenance period 226 may be expressed in flight hours 230 of aircraft 200 on which interior component 208 is installed.

Automated identification technology tags 238 may be associated with number of components 206, including interior component 208. Automated identification technology tags 238 may be attached to aircraft 200 at locations on aircraft 200 that are near number of components 206 with which automated identification technology tags 238 are associated. For example, automated identification technology tags 238 may be attached to number of components 206 with which automated identification technology tags 238 are associated.

Automated identification technology tags 238 may be active 240 or passive 242. Active 240 automated identification technology tags 238 are powered by an internal battery. Passive 242 automated identification technology tags 238 operate without a separate power source and obtain power from a reader when interrogated.

Automated identification technology tags 238 may include radio frequency identification tags 244 and contact memory 246. Radio frequency identification tags 244 use radio frequency electromagnetic fields to transfer information when interrogated by a reader. The information stored in radio frequency identification tags 244 may be read from up to several yards away. Radio frequency identification tags 244 do not need to be within the line of sight of a reader to be interrogated. For example, without limitation, radio frequency identification tags 244 may be imbedded in number of components 206.

Contact memory 246 also may be referred to as touch memory. Contact memory 246 is an electronic identification device that may be packaged in a button-shaped container. Information in contact memory 246 is accessed using a touch probe that is placed into contact with contact memory 246.

Automated identification technology tags 238 may be attached to number of components 206 or to other structures on aircraft 200 by attachment structure 254. Attachment structure 254 may include any appropriate structure for attaching automated identification technology tags 238 to number of components 206 or other structures on aircraft 200. For example, attachment structure 254 may include adhesive 256, other attachment structures 258, or a combination of structures for attaching automated identification technology tags 238 to number of components 206 or other structures on aircraft 200. Attachment structure 254 may be tamper indicating 260. For example, without limitation, radio frequency identification tags 244 may be provided with tear-off provisions built in the tag so that when the tag is disturbed or damaged, the tag is disabled and rendered inoperative by the separation of the microchip from the antenna and packaging.

In accordance with an illustrative embodiment, component maintenance information 262 for number of components 206 may be stored in associated automated identification technology tags 238. Component maintenance information 262 stored in automated identification technology tags 238 may include information for identifying when an associated number of components 206 should be replaced. For example, component maintenance information 262 stored in automated identification technology tags 238 may include information for identifying when number of components 206 are installed on aircraft 200. Component maintenance information 262 stored in automated identification technology tags 238 also may include information identifying maintenance period 226 for number of components 206.

Component maintenance information 262 may be stored in automated identification technology tags 238 at the time that associated number of components 206 are installed on aircraft 200. Component maintenance information 262 stored in automated identification technology tags 238 may be changed when associated number of components 206 is moved from aircraft 200 to other aircraft 264. However, information that is stored in automated identification technology tags 238 for identifying when number of components 206 is installed on aircraft 200 may not be changed when number of components 206 is moved from aircraft 200 to other aircraft 264. In this case, the remaining portion of maintenance period 226 for number of components 206 is not reset when number of components 206 is moved from aircraft 200 to other aircraft 264.

Figure 3:
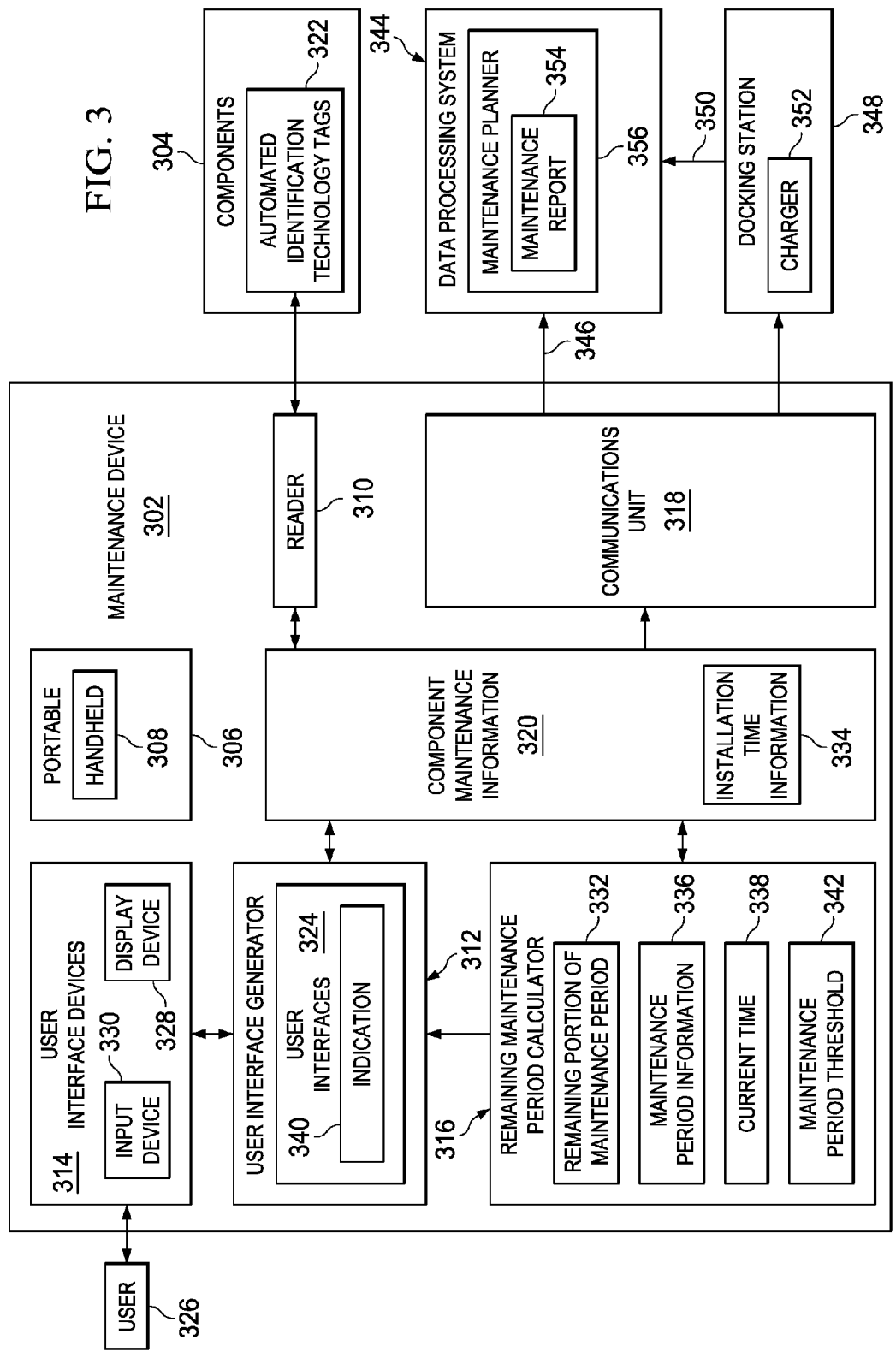
FIG. 3 is an illustration of a block diagram of a maintenance device in accordance with an illustrative embodiment.

Turning now to FIG. 3, an illustration of a block diagram of a maintenance device is depicted in accordance with an illustrative embodiment. In this example, maintenance device 302 is an example of one implementation of portable maintenance device 126 in FIG. 1. Maintenance device 302 is configured to be used for maintaining components 304. For example, components 304 may be number of components 206, including interior component 208, on aircraft 200 in FIG. 2.

Maintenance device 302 may be portable 306. For example, maintenance device 302 may be handheld 308.

Maintenance device 302 may include reader 310, user interface generator 312, user interface devices 314, remaining maintenance period calculator 316, and communications unit 318.

Reader 310 may be configured to read component maintenance information 320 from automated identification technology tags 322 associated with components 304. Reader 310 also may be configured to write component maintenance information 320 to automated identification technology tags 322, thereby to store or change component maintenance information 320 on automated identification technology tags 322 associated with components 304.

Component maintenance information 320 read from automated identification technology tags 322 may be provided from reader 310 to user interface generator 312. User interface generator 312 may be configured to generate user interfaces 324 for displaying component maintenance information 320 read from automated identification technology tags 322 to user 326. For example, user 326 may be a maintenance technician or other operator of maintenance device 302.

User interfaces 324 may be displayed to user 326 on user interface devices 314. For example, user interface devices 314 may include any appropriate display device 328 for displaying user interfaces 324 to user 326.

User interfaces 324 also may be configured to receive input from user 326. For example, user interfaces 324 may be configured to allow user 326 to control the reading of component maintenance information 320 from automated identification technology tags 322 by reader 310. User interfaces 324 also may be configured to receive component maintenance information 320 input from user 326 and to allow user 326 to control the storing of component maintenance information 320 on automated identification technology tags 322 by reader 310.

User interface devices 314 may include any appropriate input devices 330 for receiving input from user 326. For example, without limitation, display device 328 and input device 330 may be combined into a single device, such as a touch screen display.

Component maintenance information 320 read from automated identification technology tags 322 may be provided from reader 310 to remaining maintenance period calculator 316. Remaining maintenance period calculator 316 may be configured to determine remaining portion of maintenance period 332 for components 304 using component maintenance information 320 read from automated identification technology tags 322 associated with components 304.

For example, component maintenance information 320 may include installation time information 334 identifying a time that components 304 are installed or maintained. Maintenance period information 336 may identify an amount of time that components 304 are expected to remain in working order after components 304 are installed or maintained. Maintenance period information 336 for components 304 may be included in component maintenance information 320 read from automated identification technology tags 322, stored on maintenance device 302 for use by remaining maintenance period calculator 316, or retrieved by maintenance device 302 from an appropriate source when needed. Remaining portion of maintenance period 332 for components 304 may be determined by comparing the difference between the installation time for components 304 in installation time information 334 and current time 338 with the maintenance period for components 304 in maintenance period information 336.

User interface generator 312 may be configured to generate user interfaces 324 for displaying indication 340 of remaining portion of maintenance period 332 to user 326. Indication 340 of remaining portion of maintenance period 332 may be displayed in user interfaces 324 in any appropriate manner. For example, indication 340 of remaining portion of maintenance period 332 may be displayed to user 326 using any appropriate text, graphics, or both text and graphics.

Indication 340 of remaining portion of maintenance period 332 may be selected based on a comparison of remaining portion of maintenance period 332 to maintenance period threshold 342. For example, without limitation, maintenance period threshold 342 may be a selected percentage of the maintenance period for components 304. In this case, when remaining portion of maintenance period 332 is less than maintenance period threshold 342, indication 340 of remaining portion of maintenance period 332 may be displayed using appropriate colors or in another manner to indicate that components 304 are nearing the end of the maintenance period and should be replaced or maintained soon. Maintenance period threshold 342 may include a number of maintenance period thresholds.

Component maintenance information 320 read from automated identification technology tags 322 by reader 310 may be provided to communications unit 318 for communication to data processing system 344. Data processing system 344 may include any computer or other data processing system that may be separate from maintenance device 302. For example, without limitation, maintenance entity data processing system 130 in FIG. 1 may be an example of one implementation of data processing system 344.

Communications unit 318 may be configured to send component maintenance information 320 and other information to data processing system 344 at any appropriate time via wireless connection 346. Alternatively, or additionally, communications unit 318 may be configured to send component maintenance information 320 and other information to data processing system 344 via docking station 348 when maintenance device 302 is placed in docking station 348. Docking station 348 may be connected to data processing system 344 via connection 350. Connection 350 may be a wired or wireless connection.

Maintenance device 302 may be a battery powered device. In this case, docking station 348 also may be configured to operate as charger 352 for charging a battery in maintenance device 302 when maintenance device 302 is placed in docking station 348.

Data processing system 344 may be configured to use component maintenance information 320 received from maintenance device 302 to generate maintenance report 354 for components 304. For example, without limitation, maintenance report 354 may indicate components 304 that should be replaced or maintained. Maintenance report 354 may be used as part of maintenance planner 356 for managing the maintenance of components 304.

The illustration of FIG. 3 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 4:
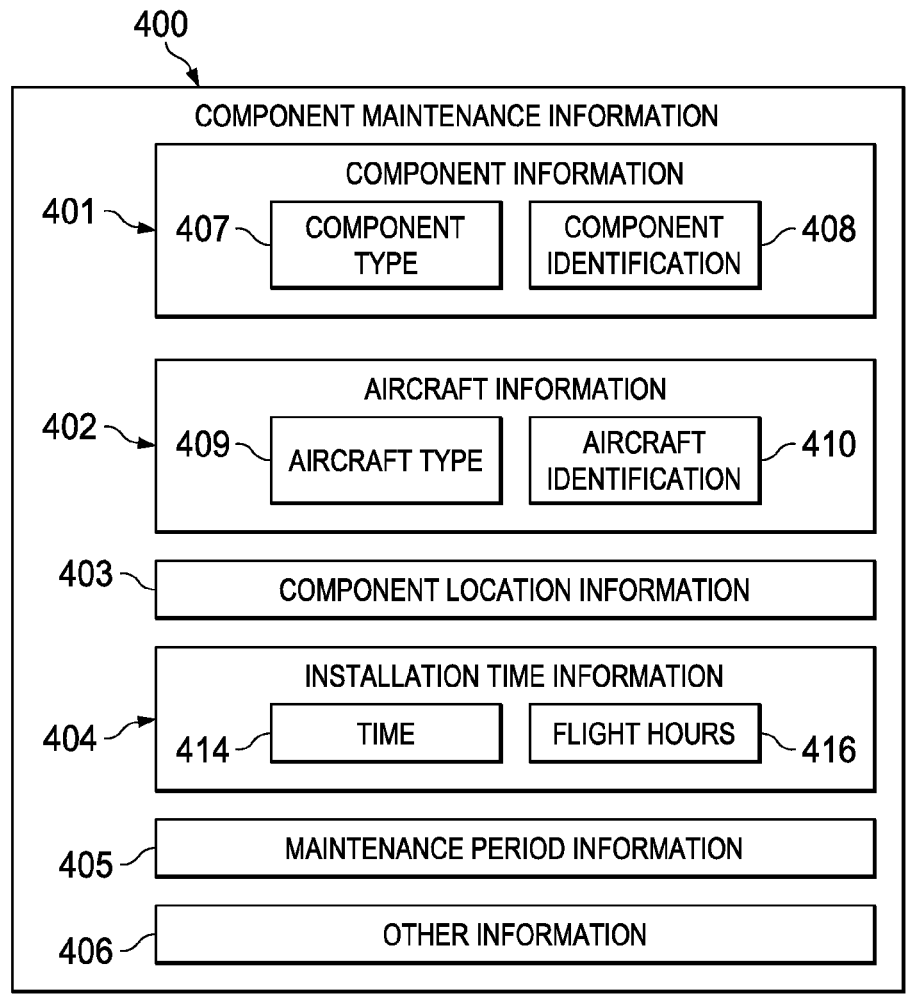
FIG. 4 is an illustration of a block diagram of component maintenance information in accordance with an illustrative embodiment.

Turning now to FIG. 4, an illustration of a block diagram of component maintenance information is depicted in accordance with an illustrative embodiment. In this example, component maintenance information 400 is an example of component maintenance information 262 in FIG. 2 and component maintenance information 320 in FIG. 3.

For example, without limitation, component maintenance information 400 may include component information 401, aircraft information 402, component location information 403, installation time information 404, maintenance period information 405, and other information 406. Component information 401 may include information for identifying component type 407 and component identification 408. Aircraft information 402 may include information for an aircraft in which the component is installed. For example, without limitation, aircraft information 402 may include information to identify aircraft type 409 and aircraft identification 410. Component location information 403 may identify the location on an aircraft at which the component is installed. Installation time information 404 may identify time 414 that the component is installed. For example, installation time information 404 may be expressed in calendar time, flight hours 416, or both.

Figure 5:
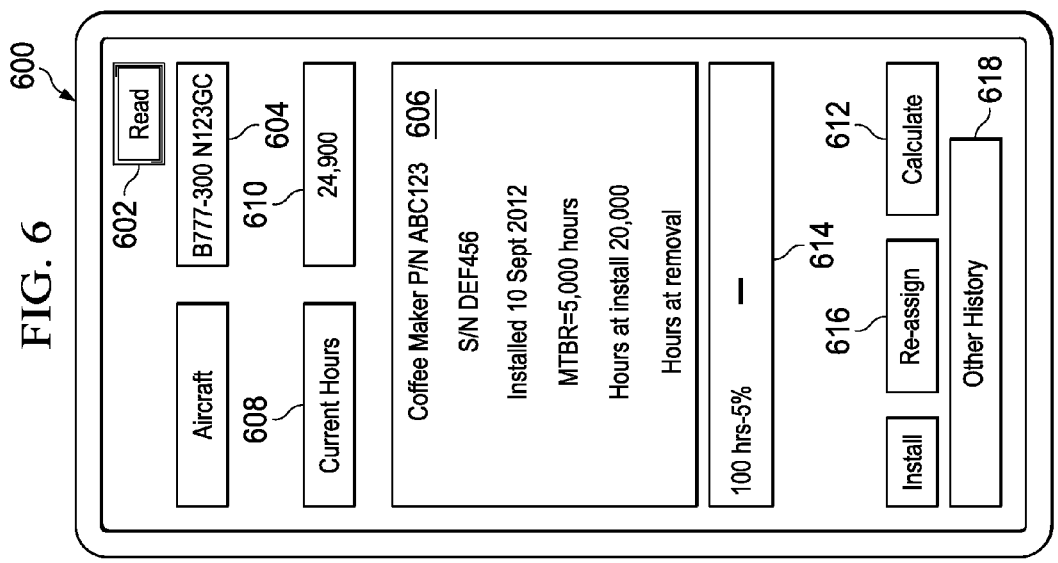
FIG. 5 is an illustration of a user interface for a maintenance device at the time of installing a component on the interior of an aircraft in accordance with an illustrative embodiment.

Turning now to FIG. 5, an illustration of a user interface for a maintenance device at the time of installing a component on the interior of an aircraft is depicted in accordance with an illustrative embodiment. In this example, user interface 500 is an example of one implementation of user interfaces 324 for maintenance device 302 in FIG. 3.

In this example, a user may select button 502 to select or enter aircraft identification information 504 for identifying an aircraft on which the component is being installed. The user may select button 506 to enter current flight hours 508 for the aircraft at the time of installation. Information 510 identifying the component being installed, the time of installation, and a maintenance period for the component also may be entered and/or displayed. In this example, the maintenance period for the component is 5,000 hours and the time of installation is the current time, 20,000 hours. Indication 512 of the remaining portion of the maintenance period also may be displayed. In this case, indication 512 shows that the remaining portion of the maintenance period is the entire maintenance period, 5,000 hours. The user may select button 514 to store aircraft identification information 504, current flight hours 508, and information 510 on an automated identification technology tag associated with the component.

Figure 6:
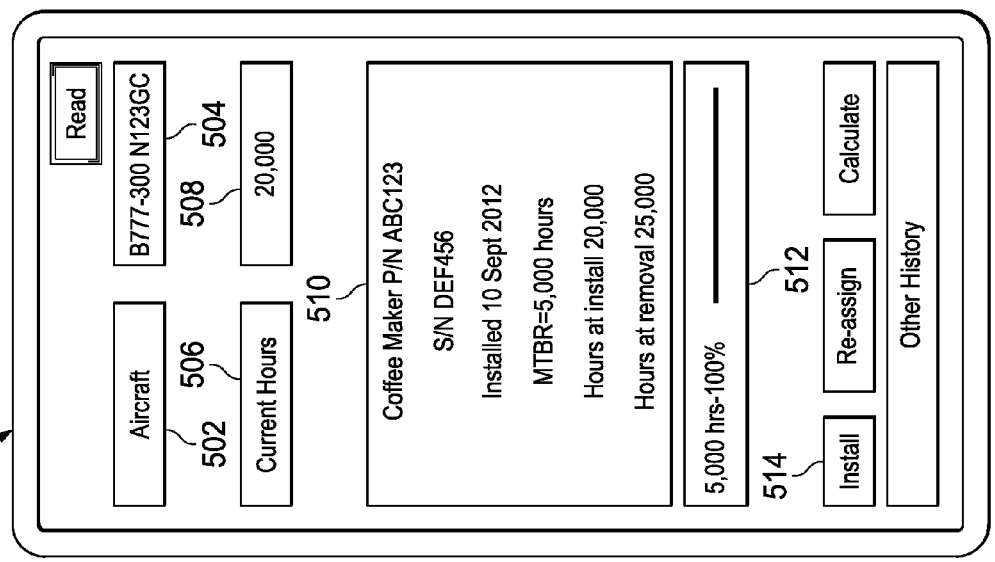
FIG. 6 is an illustration of a user interface for a maintenance device after reading component maintenance information from an automated identification technology tag associated with a component on the interior of an aircraft during a maintenance check in accordance with an illustrative embodiment.

Turning now to FIG. 6, an illustration of a user interface for a maintenance device after reading component maintenance information from an automated identification technology tag associated with a component on the interior of an aircraft during a maintenance check is depicted in accordance with an illustrative embodiment. In this example, user interface 600 is another example of one implementation of user interfaces 324 for maintenance device 302 in FIG. 3.

In this example, a user has selected button 602 to read the information from an automated identification technology tag associated with a component that was stored on the automated identification technology tag when the component was installed using user interface 500 in FIG. 5. The component maintenance information read from the automated identification technology tag may be displayed on user interface 600 at display 604 and display 606. The user may select button 608 to enter the current flight hours 610 for the aircraft at the time the information is read from the automated identification technology tag. The user may select button 612 to determine the remaining portion of the maintenance period for the component using the information read from the automated identification technology tag. Indication 614 of the determined remaining portion of the maintenance period may be displayed. In this case, the current flight hours are 24,900 and indication 614 indicates that the remaining portion of the maintenance period is only 100 hours, 5% of the maintenance period for the component.

A user may select button 616 if a component is to be moved to another aircraft. Selecting button 616 may allow the user to update information identifying the aircraft on which the component is installed without resetting the running of the maintenance period. The user may select button 618 to display other information regarding the maintenance history of the component on user interface 600.

FIG. 5 and FIG. 6 show the use of flight hours to indicate the time of installation of a component on an aircraft and for determining the remaining portion of the maintenance period for the component. However, as discussed above, ordinary time measured by a calendar or clock also may be used.

Turning now to FIG. 7, an illustration of a maintenance report is depicted in accordance with an illustrative embodiment. In this example, maintenance report 700 is an example of one implementation of maintenance report 354 in FIG. 3. For example, maintenance report 700 may be used by a maintenance entity, aircraft operator, or other entity to manage the maintenance of interior components on a number of aircraft.

Maintenance report 700 may include indications 702 of the remaining portion of the maintenance period for various components. In this example, the format of indications 702 is selected using maintenance period threshold 704 of 20%. Maintenance period threshold 704 may be fixed or user selectable. In this example, indication 706 identifies a component wherein the remaining portion of the maintenance period for the component is less than the maintenance period threshold. Menu 708 may be displayed in response to selecting indication 706. Menu 708 may present various actions that may be taken in response to identifying a component that may be nearing the time for replacement or maintenance.

In FIGS. 5-7 indications of the remaining portion of a maintenance period for various components include text indicating a remaining percentage of the maintenance period and a bar for indicating the remaining portion of the maintenance period graphically. These indications may be presented in other or additional ways in other illustrative embodiments.

Figure 8:
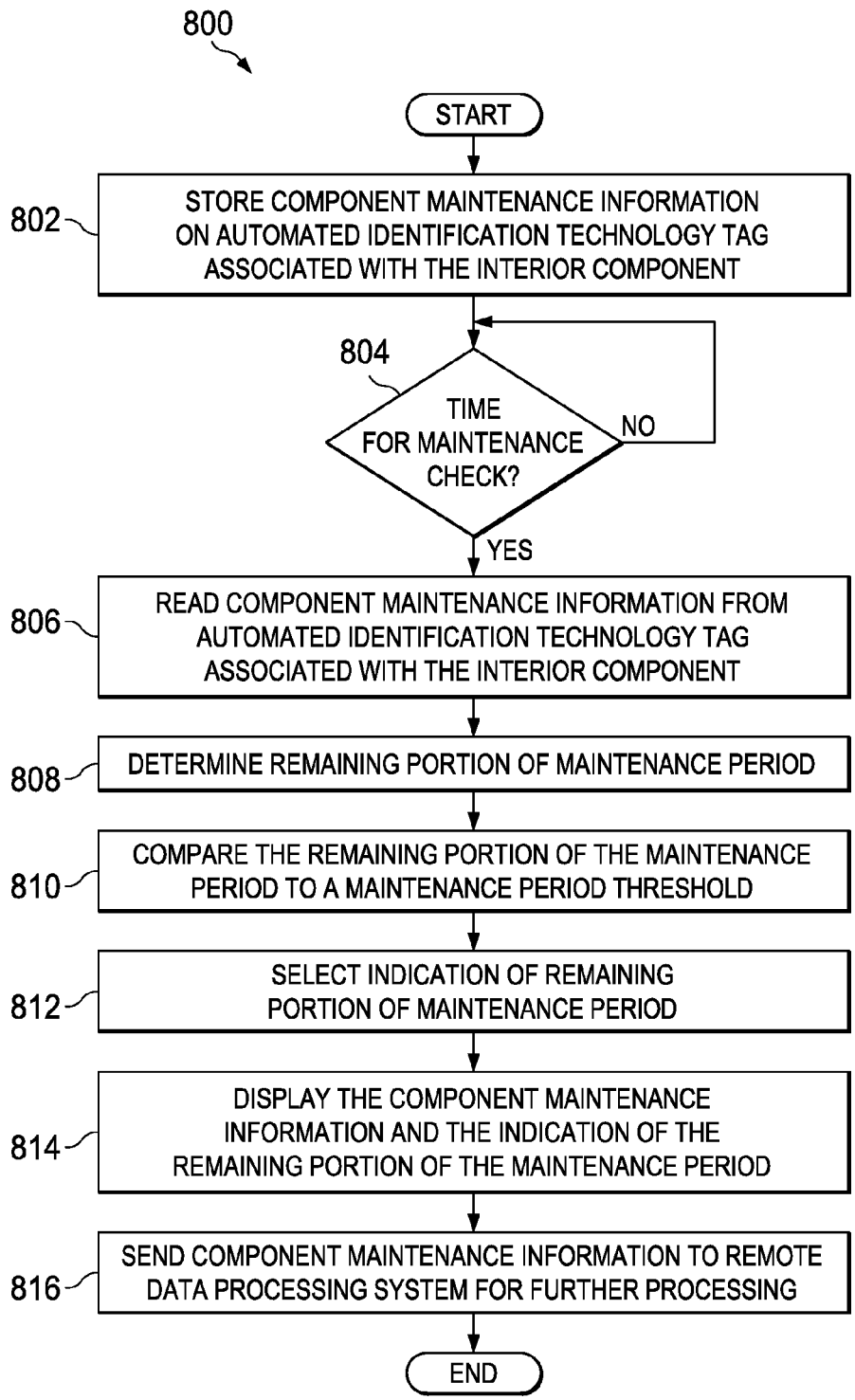
FIG. 8 is an illustration of a flowchart of a process for managing the maintenance of an interior component on a vehicle in accordance with an illustrative embodiment.

FIG. 8 is an illustration of a flowchart of a process for managing the maintenance of an interior component on a vehicle in accordance with an illustrative embodiment. Process 800 may be performed, for example, using maintenance device 302 in FIG. 3.

Process 800 may begin by storing component maintenance information on an automated identification technology tag associated with the interior component (operation 802). For example, the automated identification technology tag may be attached to the interior component or to the vehicle near the interior component. The component maintenance information may include installation time information identifying a time that the interior component is installed on the vehicle. Operation 802 may be performed at the time that the interior component is installed on the vehicle.

It then may be determined whether it is time to perform a maintenance check on the interior component (operation 804). Operation 804 may be repeated until it is determined that it is time to perform a maintenance check on the interior component. Maintenance checks may be performed periodically at designated times or at any other appropriate time.

When it is determined at operation 804 that it is time to perform a maintenance check, the component maintenance information may be read from the automated identification technology tag associated with the interior component (operation 806). The component maintenance information read from the automated identification technology tag then may be used to determine a remaining portion of the maintenance period for the component (operation 808). For example, operation 808 may include comparing the difference between the installation time for the component and the current time with the maintenance period for the component to determine the remaining portion of the maintenance period for the component.

The remaining portion of the maintenance period then may be compared to a maintenance period threshold (operation 810). An indication of the remaining portion of the maintenance period then may be selected based on the comparison in operation 810 (operation 812). For example, operations 810 and 812 may be performed to select different indications for the remaining portion of the maintenance period depending on how much of the maintenance period for the component remains to run before the component should be replaced or otherwise maintained.

The component maintenance information and the indication of the remaining portion of the maintenance period then may be displayed (operation 814). The component maintenance information also may be sent to a remote data processing system for further processing (operation 816), with the process terminating thereafter.

Turning now to FIG. 9, an illustration of a block diagram of a data processing system is depicted in accordance with an illustrative embodiment. In this example, data processing system 900 is an example of one implementation of a data processing system for implementing maintenance device 302 in FIG. 3.

In this illustrative example, data processing system 900 includes communications fabric 902. Communications fabric 902 provides communications between processor unit 904, memory 906, persistent storage 908, communications unit 910, input/output unit 912, and display 914. Memory 906, persistent storage 908, communications unit 910, input/output unit 912, and display 914 are examples of resources accessible by processor unit 904 via communications fabric 902.

Processor unit 904 serves to run instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and other suitable information either on a temporary basis or a permanent basis. Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code. As one example, data processing system 900 may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as that found in an interface and memory controller hub that may be present in communications fabric 902.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for maintaining a component on a vehicle, comprising:
   reading component maintenance information from an automated identification technology tag on the vehicle, wherein the automated identification technology tag is associated with an interior component on the vehicle;
   determining a remaining portion of a maintenance period for the interior component using the component maintenance information;
   displaying an indication of the remaining portion of the maintenance period on a user interface; and
   responsive to a determination that the interior component should be moved to a second vehicle, updating information regarding which vehicle the interior component is installed without resetting the maintenance for the interior component.

2. The method of claim 1, wherein the automated identification technology tag is selected from a radio frequency identification tag and a contact memory.

3. The method of claim 1, wherein the automated identification technology tag is attached to the interior component.

4. The method of claim 1, wherein the component maintenance information comprises installation time information identifying a time that the interior component is installed on the vehicle.

5. The method of claim 4, further comprising:
   storing the installation time information on the automated identification technology tag at the time that the interior component is installed on the vehicle.

6. The method of claim 1 further comprising:
   selecting the indication of the remaining portion of the maintenance period in response to a comparison between the remaining portion of the maintenance period and a maintenance period threshold.

7. The method of claim 1, wherein reading the component maintenance information, determining the remaining portion of the maintenance period, and displaying the indication of the remaining portion of the maintenance period is performed by a maintenance device that is portable.

8. The method of claim 7 further comprising:
   sending the component maintenance information from the maintenance device to a data processing system that is not on the vehicle.

9. An apparatus, comprising:
   a reader comprising a processor, the reader configured to read component maintenance information from an automated identification technology tag on a vehicle, wherein the automated identification technology tag is associated with an interior component on the vehicle;
   a remaining maintenance period calculator configured to determine a remaining portion of a maintenance period for the interior component using the component maintenance information, wherein responsive to a determination that the interior component should be moved to a second vehicle, the remaining maintenance period calculator updates information regarding which vehicle the interior component is installed without resetting the maintenance for the interior component; and
   a user interface generator configured to display an indication of the remaining portion of the maintenance period on a user interface.

10. The apparatus of claim 9, wherein the automated identification technology tag is selected from a radio frequency identification tag and a contact memory.

11. The apparatus of claim 9, wherein the automated identification technology tag is attached to the interior component.

12. The apparatus of claim 9, wherein the component maintenance information comprises installation time information identifying a time that the interior component is installed on the vehicle.

13. The apparatus of claim 12, wherein the reader is further configured to send the installation time information to the automated identification technology tag to store the installation time information on the automated identification technology tag at the time that the interior component is installed on the vehicle.

14. The apparatus of claim 9, wherein the remaining maintenance period calculator is configured to compare the remaining portion of the maintenance period to a maintenance period threshold; and the user interface generator is configured to select the indication of the remaining portion of the maintenance period in response to a comparison between the remaining portion of the maintenance period and the maintenance period threshold.

15. The apparatus of claim 9, wherein the apparatus is a maintenance device that is portable.

16. The apparatus of claim 15 further comprising:
   a communications unit configured to send the component maintenance information from the maintenance device to a data processing system that is not on the vehicle.

17. The apparatus of claim 9, wherein the vehicle is an aircraft and the interior component is a galley appliance on the aircraft.

18. A method for maintaining an interior component on an aircraft comprising:
   identifying, by a processor, component maintenance information from an automated identification technology tag on the aircraft, wherein the automated identification technology tag is associated with the interior component on the aircraft and the component maintenance information comprises installation time information identifying a time that the interior component is installed on the aircraft;
   determining, by the processor, a remaining portion of a maintenance period for the interior component using the installation time information;
   displaying, by the processor, an indication of the remaining portion of the maintenance period on a user interface; and
   responsive to a determination that the interior component should be moved to a second vehicle, updating, by the processor, information regarding which vehicle the interior component is installed without resetting the maintenance for the interior component.

19. The method of claim 18, wherein the installation time information comprises information identifying flight hours for the aircraft at the time that the interior component is installed on the aircraft.

20. The method of claim 18, wherein the component maintenance information comprises aircraft information for identifying the aircraft and further comprising changing the aircraft information on the automated identification technology tag without changing the installation time information in response to moving the interior component and the automated identification technology tag to another aircraft.

* * * * *